June 8, 1943.   J. H. HAMMOND, JR   2,321,381
PROPELLER CONTROL SYSTEM
Filed Sept. 23, 1941   2 Sheets-Sheet 1

INVENTOR
JOHN HAYS HAMMOND, JR.
BY
ATTORNEY

June 8, 1943. J. H. HAMMOND, JR 2,321,381
PROPELLER CONTROL SYSTEM
Filed Sept. 23, 1941 2 Sheets-Sheet 2
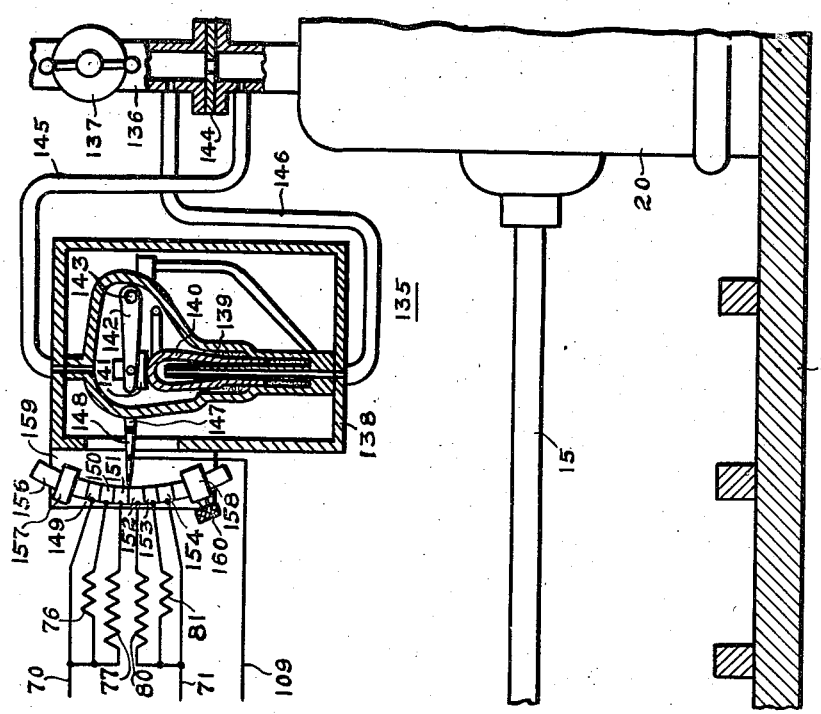
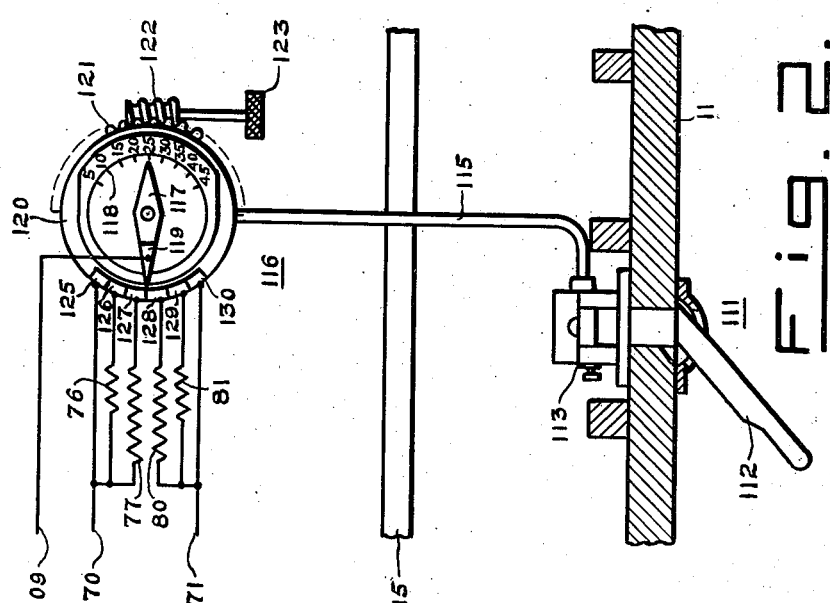
INVENTOR
JOHN HAYS HAMMOND, JR.
BY
ATTORNEY Patented June 8, 1943

2,321,381

UNITED STATES PATENT OFFICE 2,321,381

PROPELLER CONTROL SYSTEM

John Hays Hammond, Jr., Gloucester, Mass.

Application September 23, 1941, Serial No. 411,943

6 Claims. (Cl. 170—135.6)

This invention relates to variable pitch propellers and more specifically to means for varying the pitch of a propeller in accordance with the integrated value, over a definite period of time, of the deviation from normal of any one of a plurality of variable factors.

The invention provides indicating means operated by the variable factors, such as thrust, speed, or steam consumption, which controls an integrator for integrating the variation of these factors from normal over a given period of time. At specific intervals the integrator directly controls means for varying the pitch of the propeller blades in such a way as to maintain the variable factor constant.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description, taken in connection with the accompanying drawings forming a part thereof, in which Figure 1 illustrates diagrammatically the system for controlling the propeller pitch by means of the thrust of the propeller shaft;

Figure 2 illustrates diagrammatically the system for controlling the propeller pitch by means of the speed of the vessel and;

Figure 3 illustrates diagrammatically the system for controlling the propeller pitch by means of the steam consumption of the prime mover.

Like reference characters denote like parts in the several figures of the drawings.

Figure 1:
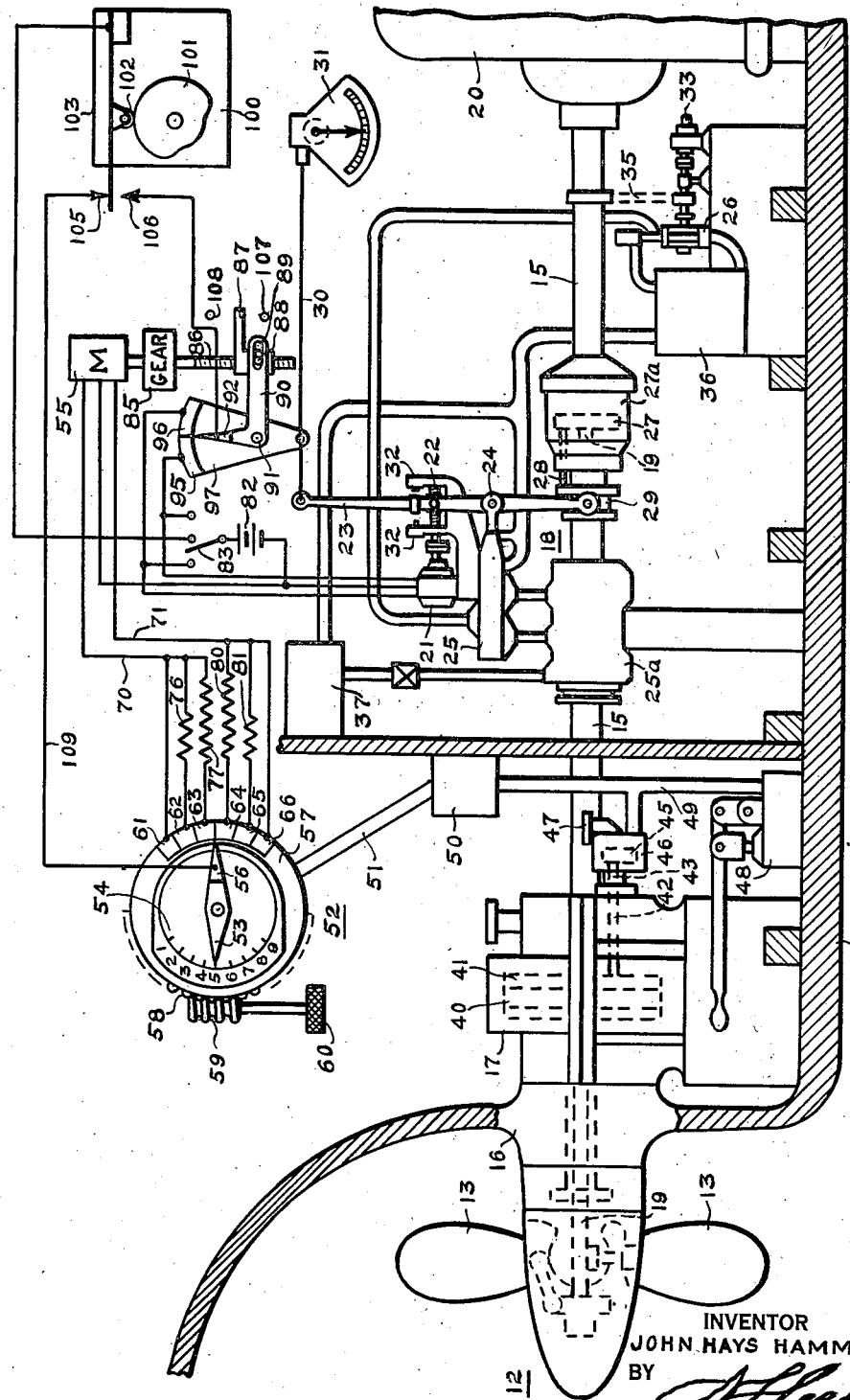

In the following description and in the claims parts will be identified by specific names for convenience, but they are intended to be as generic in their application to similar parts as the art will permit.

Referring to the accompanying drawings, and more particularly to Figure 1, the hull of a marine vessel is indicated as 11. This vessel is driven by means of a propeller 12 which is provided with adjustable blades 13. The propeller 12 is attached to the end of a hollow shaft 15 which passes through an outboard bearing 16 and a thrust bearing 17. The shaft 15 is driven by a prime mover 20 which may be of any desired type and is preferably provided with a governor for maintaining a constant speed of rotation.

The blades 13 are connected to a variable pitch mechanism 18 which may be of any well known and standard construction such as that manufactured by the Escher Wyss Company of Zurich, Switzerland, the details of which form no part of the present invention and are accordingly not specifically set forth herein. This mechanism, in general, comprises a rod 19 slidable longitudinally within the shaft 15 and connected to control the pitch of the blades 13.

The rod 19 is actuated by a piston 27 in a fluid pressure cylinder 27a. Fluid for actuating the piston 27 is supplied by a pump 26 through a control valve 25 and a distribution valve 25a which communicates with the cylinder 27a through ducts, not shown, in the shaft 15. A motor 21 rotates a worm 22 which operates to move the upper end of a floating lever 23, which, in turn, is pivoted to the end of valve rod 24 which controls the valve 25. The piston 27 is connected by a rod 28 to a collar 29 which is slidably mounted on the shaft 15 and engages the lower end of the lever 23 so that the position of this end of the lever corresponds to the pitch of the blades 13.

The upper end of the lever 23 is connected by a rod 30 to an indicator 31 which shows the pitch at which the blades 13 are set. Stops 32 are provided for limiting the maximum and minimum pitch of the blades 13. The fluid pump 26 is driven either by a motor 33 or a belt 35 from the shaft 15. A reservoir 36 and a supply tank 37 are provided for the necessary fluid.

It is to be understood that other pitch control devices may be employed in place of that referred to above, for varying the pitch of the propeller blades 13 in response to actuation of the motor 21. A particular type is shown for purposes of illustration only.

The thrust bearing 17 is also of standard construction and only so much thereof has been shown as is necessary to an understanding of this invention. In the form shown the thrust bearing is provided with the usual collar 40 and shoe 41 which is engaged by thrust pins 42, which in turn cooperate with piston pins 43, the outer ends of which are engaged by pistons 45 which reciprocate in cylinders 46. Mounted on the cylinders 46 are gauges 47 which indicate the travel of the pistons 45. Fluid under pressure for operating the system is supplied by a manually operated pump 48 which is connected by piping 49 to the cylinders 46 and to a damping valve 50. This valve is connected by a pipe 51 to an indicator 52 which is provided with a pointer 53 which registers with a scale 54 which may be graduated in thousands of pounds thrust.

While the thrust bearing and meter shown is the type manufactured by the Kingsbury Machine Works of Philadelphia, Pennsylvania, it is to be understood that any other suitable type of thrust bearing and meter may be employed for the purpose.

In accordance with the present invention, means is provided for controlling a motor 55 by the position of the pointer 53. In the embodiment shown, this is accomplished by providing a contact 56, attached to, but insulated from, the pointer 53 and a ring 57 surrounding the indicator 52 and rotatably mounted thereon. The ring 57 carries a segment of worm gear 58. Meshing with the gear 58 is a worm 59 which may be rotated by means of a knurled knob 60. Mounted on but insulated from the ring 57 are a plurality of contact segments 61 to 66 which are selectively engaged by the contact 56.

The segments 61 and 66 are connected by flexible conductors to two conductors 70 and 71 which in turn are connected to the reversing windings of the motor 55. The segments 62 and 63 are connected by flexible conductors to two resistors 76 and 77, the other ends of which are connected to the conductor 70. The segments 64 and 65 are connected by flexible conductors to two resistors 80 and 81 the other sides of which are connected to the conductor 71. The return lead from the windings of motor 55 is connected to one side of a battery 82 the other side of which is connected to the blade of a three position switch 83.

The motor 55 is connected thru a reduction gearing 85 to a threaded shaft 86 upon which is mounted a rider 87. The rider 87 is provided with a pin 88 which engages a slot 89 provided in an L shaped arm 90 which is pivoted for rotation at 91. Mounted on but insulated from the upper end of arm 90 is a contact 92, which selectively engages two contact segments 95 and 96 which are mounted on but insulated from a member 97 which is pivoted for rotation at 91. The lower end of the member 97 is attached to the rod 30. The contacts 95 and 96 are connected to the reversing windings of the motors 21 and to the outside contact points of the switch 83.

A timing device 100 is provided with a cam 101 which may be rotated at any desired speed, for example, one revolution in 20 minutes. Engaging the cam 101 is a roller 102 which is mounted on but insulated from a contact arm 103 which is connected to the center contact point of the switch 83. Mounted adjacent to the contact arm 103 are two contacts 105 and 106, the former being connected by a conductor 109 to the contact 56 and the latter to the contact 92. Two pins 107 and 108 are provided for limitting the motion of the rider 87.

*Operation of Figure 1*

In the operation of the form of the invention shown in Figure 1, the pitch of the blades 13 is set at the normal operating angle for the conditions under which it is desired to operate the vessel. The setting of the propeller blades 13 is accomplished by moving the blade of the switch 83 into the right or left position which will cause the motor 21 to move the upper end of the lever 23 to the left or right to increase or decrease the pitch in a well known manner, the angle of pitch being indicated by the pointer of the indicator 31.

The vessel is then brought up to the desired speed and the pump 48 is manually operated to build up hydraulic pressure in the system, this pressure being indicated by the pointer 53 on the scale 54. After the pressure has been built up sufficiently behind the pistons 45 it will exert enough pressure through the piston pins 43 and thrust pins 42 to take the entire thrust of the propeller 12. When this condition has been reached, as indicated by the gauges 47, the manual operation of the pump 48 is stopped. The thrust of the propeller is now indicated by the pointer 53 on the scale 54 which in this example is shown as 5,000 pounds. The ring 57 is then rotated by means of the knurled knob 60 until the insulation between the segments 63 and 64 engages the contact 56. The blade of the switch 83 is then moved into engagement with the center contact.

If the conditions under which the vessel is travelling should change, such as by encountering a strong head wind or running into a heavy sea and the thrust be thereby increased, the piston 45 will receive more pressure so that the hydraulic cylinder 46 will transmit more pressure to the indicator 52, the pointer 53 of which will therefore rotate in counterclockwise direction to indicate an increase of thrust. The contact 56 will then engage the segment 63 and a circuit will be closed from the battery 82 thru the contact arm 103, contact 105, conductor 109, contact 56, segment 63 and resistor 77 to the motor 55 causing it to rotate slowly. This motion is further reduced by the reduction gearing 85 so that the threaded shaft 86 causes the rider 87 to move very slowly upward. This motion will continue while the contact 56 is on the segment 63, but will stop if the rider 87 moves far enough to engage the pin 108. The pins 107 and 108 are used to limit the motion of the rider 87 and contact 92.

If the unfavorable conditions increase, the thrust will increase and the contact 56 will engage the segment 62. The speed of the motor 55 will increase as the current now passes thru the resistor 76, which has less resistance than the resistor 77. This will accelerate the slow upward motion of the rider 87 which will continue at this increased rate while the contact 56 is on the segment 62. If the thrust is further increased so that the contact 56 rests on the segment 61, then no resistance will be thrown in the circuit of the motor 55 and it will rotate at its maximum speed, thus causing the rider 87 to move upward at its maximum rate, which, however, is still quite slow.

These operations continue for a given period of time, for example 15 minutes, at the end of which the cam 101 will have rotated to a position where the roller 102 will drop down on the lower segment of the cam. This will cause the arm 103 to disengage the contact 105 and engage the contact 106, thus opening the circuit thru the motor 55 which will stop.

The position of the rider 87, arm 90 and contact 92 will be proportional to the integrated deviation of the thrust from normal during the 15 minute period and will represent the amount of correction which should be applied to the propeller pitch. As the contact 92 is in engagement with the segment 95 a circuit will be closed from the battery 82 thru arm 103, contact 106, contact 92, segment 95 to the motor 21 causing it to rotate in a direction to move the upper end of the lever 23 to the right. This will move the valve 24 to the right which will allow fluid under pressure to pass from the pump 26 to the cylinder 27a by means of the ducts in the shaft 15.

This will actuate the piston 27 to shift the rod 19 to the left which will cause the propeller blades 13 to decrease their pitch. As the upper end of the lever 23 moves to the right it will move the rod 30 to the right which will rotate the member 97 in a counter clockwise direction until the contact 92 rests on the insulation between the segments 95 and 96 thus stopping the motor 21.

Movement of the piston 27 and collar 29 to the left shifts the lever 23 to the left until the valve 25 is again in its neutral position to cut off the further supply of fluid to the cylinder 27a.

The cam 101 will rotate for a given period, for example five minutes, with the roller 102 on the lower segment. At the end of this time the roller 102 will move onto the upper segment thus raising the arm 103 which will disengage the contact 106 and engage the contact 105. During this five minute interval the condition of propulsion has changed due to the decrease of propeller pitch thus decreasing the thrust to normal of 5,000 lbs. at which figure the contact 56 will again rest on the insulation between the segments 63 and 64.

With the closing of the contact 105 the circuit from the battery 82 has been returned to the motor 55. Now if the thrust should decrease due to a following wind or other favorable conditions, the reverse action would take place, thus causing the rider 87 to move slowly downward for a period of 15 minutes, the rate of motion being dependent on the deviation of the thrust from normal. At the end of this period the motor 55 would be thrown out of circuit and the motor 21 thrown in circuit by the action of the cam 101, as already described. As this time the contact 92 would be on the segment 96 the motor 21 would be rotated so as to move the upper end of the lever 23 to the left, thus increasing the propeller pitch and at the same time rotating the member 97 in a clockwise direction. This motion will continue until the contact 92 rests on the insulation between the segments 95 and 96 thus stopping the motor 21.

It is thus seen that during an interval of fifteen minutes the amount of deviation of the thrust from normal is integrated, this integrated value being indicated by the position of the contact 92. Then the thrust indicator 52 is disconnected from the integrator and the pitch setting mechanism is connected for a period of five minutes during which time the pitch of the blades 13 is changed an amount proportional to the integrated deviation of thrust, which causes the thrust to return to normal.

The variation of the propeller pitch by the use of the integrator may also be controlled by the speed of the vessel as shown in Figure 2. In this figure a speedometer 111 is shown as being mounted in the hull of the vessel 11. This speedometer may be of any well known and standard construction, such as that made by the Kenyon Instrument Company of Huntington, Long Island, New York, and known as the Kenyon speedometer. This comprises a strut 112 which is attached to a metallic bellows 113 containing fluid under pressure. The bellows 113 is connected by a hydraulic tube 115 to a speed indicator 116 which is provided with a pointer 117 which registers with a scale 118 graduated in knots. It is to be understood that other types of speed indicating devices may be used if desired.

In accordance with the present invention means is provided to control the integrator motor 55, shown in Figure 1, in response to the position of the pointer 117. In the embodiment shown a contact 119 is attached to but insulated from the pointer 117. Surrounding the speed indicator 116 and rotatably mounted thereon is a ring 120 to which is attached a segment of a worm gear 121. Meshing with the gear 121 is a worm 122 which is rotated by means of knurled knob 123. Mounted on but insulated from the ring 120 are a plurality of contact segments 125 to 130 which are selectively engaged by the contact 119.

The segments 125 and 130 are connected to the two conductors 70 and 71 which in turn are connected to the reversing windings of the motor 55 in a manner similar to that described in connection with Figure 1. The segments 126 and 127 are connected to the two resistors 76 and 77, the other ends of which are connected to the conductor 70. The segments 128 and 129 are connected to the two resistors 80 and 81, the other ends of which are connected to the conductor 71. The contact 119 is connected to the conductor 109, the other end of which is connected to the contact 105 shown in Figure 1.

In this form of the invention the pitch changing mechanism and integrator are similar to those shown in Figure 1, but the thrust meter 17 and indicator 52, together with their associated parts numbered 40 to 66 have been replaced by the speedometer 111 and indicator 116.

Operation of Figure 2

In the operation of the modified form of the invention shown in Figure 2 the pitch of the blades 13 is set at the normal operating angle for the speed at which it is desired to operate the vessel, which for example may be 25 knots. The setting of the propeller blades 13 is accomplished in a manner similar to that described in connection with Figure 1.

The vessel is then brought up to the desired speed as indicated by the pointer 117 on the scale 118, in this case 25 knots. The ring 120 is then rotated by means of the knurled knob 123 until the insulation between the segments 127 and 128 engages the contact 119. The blade of the switch 83 (Figure 1) is then moved into engagement with the center contact.

If the conditions under which the vessel is travelling should change and the speed of the vessel diminish, the strut 112 will receive less pressure so that the hydraulic cylinder 113 will transmit less pressure to the speed indicator 116, the pointer 117 of which will therefore rotate in a counterclockwise direction to indicate a decrease of speed. The contact 119 will then engage the segment 128 and a circuit will be closed thru the resistor 80 and the motor 55 (Figure 1) which will rotate in such a direction as to cause the rider 87 to move downwards very slowly. This in a manner already described will cause the contact 92 to move to the right into engagement with the segment 96.

If the speed of the vessel should further decrease the contact 119 will engage the segment 129 and the smaller resistance 81 will be thrown into the circuit of the motor 55 thus increasing its speed of rotation. With a still further decrease of speed the contact 119 will engage the segment 130 at which time no resistance will be in the circuit of the motor 55, thus causing it to rotate at its maximum speed.

This action will continue until at the end of the fifteen minute interval the motor 55 will be thrown out of circuit and the motor 21 thrown in in a manner similar to that described in connection with Figure 1. As the contact 92 is on segment 96 the motor 21 will be rotated so as to cause the arm 23 to be moved to the left which will cause an increase in the propeller pitch. This action will continue until the member 97 has been sufficiently rotated in a clockwise direction to cause the insulation between the segments 95 and 96 to engage the contact 92 thus stopping the motor 21.

The increase of propeller pitch will cause an increase of speed of the vessel, as the propeller revolutions are kept constant by means of the governor, thus bringing the contact 119 back on the insulation between the segments 127 and 128. At the end of the five minute interval the motor 21 will be thrown out of circuit and the motor 55 thrown in.

If the conditions change so that the speed of the vessel increases the reverse action will take place and the pitch of the propellers will be decreased at the end of the fifteen minute interval.

In this way the pitch of the propeller blades 13 is varied at the end of each fifteen minute interval an amount proportional to the integrated variation of speed from normal over this interval and will cause the propeller to operate so as to draw the required power from the prime mover 20 under the changed conditions to maintain the speed of the vessel constant.

The variation of the propeller pitch by the use of the integrator may also be controlled by the steam consumption of the prime mover as shown in Figure 3. In this figure a fluid meter 135 is shown as being connected to the steam supply line 136 of the prime mover 20, in which is also connected a governor 137.

The fluid meter 135, which may be of any well known and standard construction such as that manufactured by the Bailey Meter Co., of Cleveland, Ohio, and described on pages 9–11 of their bulletin 301, is shown for measuring the volume of steam supplied to engine 20. The meter 135 consists essentially of a box 138 in which is mounted a bell casing 139. Positioned inside of this casing is a mercury sealed Ledoux bell 140, which is free to move up and down inside the casing 139. A cap 141 rests on top of the bell 140 and is attached by a forked lever 142 to a spindle 143.

The engine 20 is supplied with steam thru the pipe 136 in which is located an orifice plate 144. The interior of the casing 139 is connected by a tube 145 to a point in the pipe 136 below the orifice plates 144 and the interior of the bell 140 is connected by a tube 146 to a point in the pipe 136 above the orifice plate 145.

The spindle 143, which passes thru the wall of the casing 139, is connected to an arm 147. Mounted on but insulated from the arm 147 is a contact 148, which selectively engages six segments 149 to 154 mounted on but insulated from an arc shaped member 156 which is slidably mounted in brackets 157 and 158, which are attached to a plate 159 which is secured to the box 138. The bracket 158 is provided with a clamping screw 160 for holding the member 156 and contact 149—154 in any desired position.

The segments 149 and 154 are connected to the two conductors 70 and 71 which in turn are connected to reversing windings of the motor 55, as previously described in connection with Figure 1. The segments 150 and 151 are connected to the two resistors 76 and 77, the other ends of which are connected to the conductor 70. The segments 152 and 153 are connected to the two resistors 80 and 81 the other ends of which are connected to the conductor 71. The contact 148 is connected to the conductor 109, the other end of which is connected to the contact 56 as shown in Figure 1.

In this form of the invention the pitch changing mechanism and integrator are similar to those shown in Figure 1, but the thrust meter 17 and indicator 52 together with their associated parts numbered 40 to 66 have been replaced by the fluid meter 135.

Operation of Figure 3

In the operation of the modified form of the invention shown in Figure 3 the pitch of the blades 13 is set at the normal operating angle as described in connection with Figure 1.

The vessel is brought up to the desired speed in the usual manner. The steam necessary to supply the engine 20 under these conditions passes thru the orifice in the plate 144 which causes an increase of pressure in the pipe 146 and a decrease of pressure in the pipe 145. The reduced pressure established in the pipe 145 is applied to the interior of the casing 139 and the increased pressure established in the pipe 146 is applied to the interior of the bell 140. This causes the bell 140 to rise an amount proportional to the difference in pressures in the pipes 145 and 146.

The motion of the bell 140 is transmitted by means of the cap 141 and lever 142, to the arm 147 and contact 148 which takes up a position depending upon the difference in pressure inside and outside the bell 140 which is proportional to the volume of steam consumed by the engine 20. The member 156 is then moved until the insulation between the segments 151 and 152 is under the contact 148 and is held in this position by tightening the screw 160. The blade of the switch 82 is then moved into engagement with the center contact.

If the forces against which the vessel is moving should increase the speed of the propeller 12 would decrease and the throttle valve would be opened by the governor 137 to supply more steam to the engine 20. This increased volume of steam would cause a greater difference in pressure between the inside and outside of the bell 140 thus causing it to move up, which in turn would cause the contact 148 to engage the segment 151. This will close a circuit thru the resistor 77 and the motor 55 (Figure 1) which will rotate in such a direction as to cause the rider to move upward very slowly. This in a manner already described will cause the contact 92 to move to the left into engagement with the segment 95.

If the steam consumption should increase further the contact 148 will engage the segment 150 and the smaller resistance 76 will be thrown into the circuit of the motor 55 thus increasing its speed of rotation. With a still further increase in steam consumption the contact 148 will engage the segment 149 at which time no resistance will be in the circuit of the motor 55 thus causing it to rotate at its maximum speed.

This action will continue until at the end of the fifteen minute interval the motor 55 will be thrown out of circuit and the motor 21 thrown in in a manner similar to that described in connection with Figure 1. As the contact 92 is on segment 95 the motor 21 will be rotated so as to cause the arm 23 to be moved to the right which will cause a decrease in the propeller pitch. This action will continue until the member 97 has been sufficiently rotated in a counter clockwise direction to cause the insulation between the segments 95 and 96 to engage the contact 92, thus stopping the motor 21.

The decrease of propeller pitch will cause a decrease in steam consumption, thus bringing the contact 148 back on the insulation between the segments 151 and 152. At the end of the five minute interval the motor 21 will be thrown out of circuit and the motor 55 thrown in.

If the conditions change so that the steam consumption decreases the reverse action will take place and the pitch of the propellers will be increased at the end of the fifteen minute interval.

In this way the pitch of the propeller blades 13 is varied at the end of each fifteen minute interval an amount proportional to the integrated variation of steam consumption from normal over this interval and will cause the propeller to operate so that the steam consumption of the prime mover will remain constant under the changed conditions.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. In a system for driving a vessel, a propeller having blades, means controlling the pitch of said blades, condition responsive means responsive to the amount of change of a condition of propulsion of said vessel, means integrating the change of said condition responsive means over a predetermined period of time, and timed means actuated after each of said predetermined periods of time and controlled by said integrating means to cause said pitch control means to change the pitch of said blades in a direction and by an amount to compenaste for the integrated change of condition.

2. The system set forth in claim 1 in which said condition responsive means includes means to actuate said integrating means at a speed proportional to the amount of change in condition in either direction from a given median point, the speed of actuation being greater when the change of condition is greater and vice versa, regardless of the direction of said change from said median point.

3. The system set forth in claim 1 in which the condition responsive means is responsive to the thrust of said propeller.

4. The system set forth in claim 1 in which the condition responsive means comprises a thrust bearing and indicating means actuated in response to the thrust exerted on said bearing by said propeller controls the operation of said pitch control means.

5. The system set forth in claim 1 in which the condition responsive means comprises a speedometer actuated in accordance with the speed of travel of the vessel through the surrounding medium.

6. The system set forth in claim 1 in which the propeller is driven by a steam driven motor and the condition-responsive means is responsive to the steam consumption of said motor over a predetermined period of time.

JOHN HAYS HAMMOND, Jr.